(12) United States Patent
Tan et al.

(10) Patent No.: US 6,356,902 B1
(45) Date of Patent: Mar. 12, 2002

(54) METHOD AND SYSTEM FOR STORAGE AND RETRIEVAL OF MULTIMEDIA OBJECTS

(75) Inventors: Pek Yew Tan; Kok Leong Ng; Jianfeng Chen, all of Singapore (SG)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/123,544

(22) Filed: Jul. 28, 1998

(51) Int. Cl.[7] .............................................. G06F 17/30
(52) U.S. Cl. .............................. 707/10; 707/3; 709/216; 709/223; 709/239
(58) Field of Search ............................. 707/3, 10, 522; 706/50; 709/216, 223, 239; 345/440; 712/12; 714/47

(56) References Cited

U.S. PATENT DOCUMENTS

| | | | |
|---|---|---|---|
| 4,868,743 A | | 9/1989 | Nishio .............................. 707/3 |
| 5,832,182 A | * | 11/1998 | Zhang et al. ..................... 706/50 |
| 5,974,572 A | * | 10/1999 | Weinberg et al. ............... 714/47 |
| 6,047,331 A | * | 4/2000 | Medard et al. ................ 709/239 |
| 6,067,093 A | * | 5/2000 | Grau et al. .................... 345/440 |
| 6,076,106 A | * | 6/2000 | Hammer et al. ............... 709/223 |
| 6,108,676 A | * | 8/2000 | Nakatsuyama ................ 707/522 |
| 6,128,719 A | * | 10/2000 | Kim ................................ 712/12 |
| 6,144,962 A | * | 11/2000 | Weinberg et al. ............... 707/10 |

FOREIGN PATENT DOCUMENTS

EP   0650131   4/1995   .......... G06F/17/30

OTHER PUBLICATIONS

SOM–based R–tree for similarity retrieval by Sun–Seok OH et al., Dept. of Intelligent Systems, Kyushu Univeristy, Fukuoka, Jap, Proc. Database Systems for Advanced Applications, pp. 182–189, (Apr. 2001).*

"Data Structure and Algorithm Analysis in C", Benjamin/Cummings Publishing Co., Inc., 1993.

* cited by examiner

*Primary Examiner*—Diane D. Mizrahi
(74) *Attorney, Agent, or Firm*—Greenblum & Bernstein, P.L.C.

(57) ABSTRACT

A method for storing and organizing multimedia objects by decomposing a multi-level tree structure into a graph map using single-link graph nodes, assigning a name or address to each node in the tree structure in ascending order from a root node to the last leaf node, mapping each node in the tree structure to a single-link graph node having a pointer memory location, and storing the horizontal or vertical coupled graph nodes into a page memory.

5 Claims, 9 Drawing Sheets

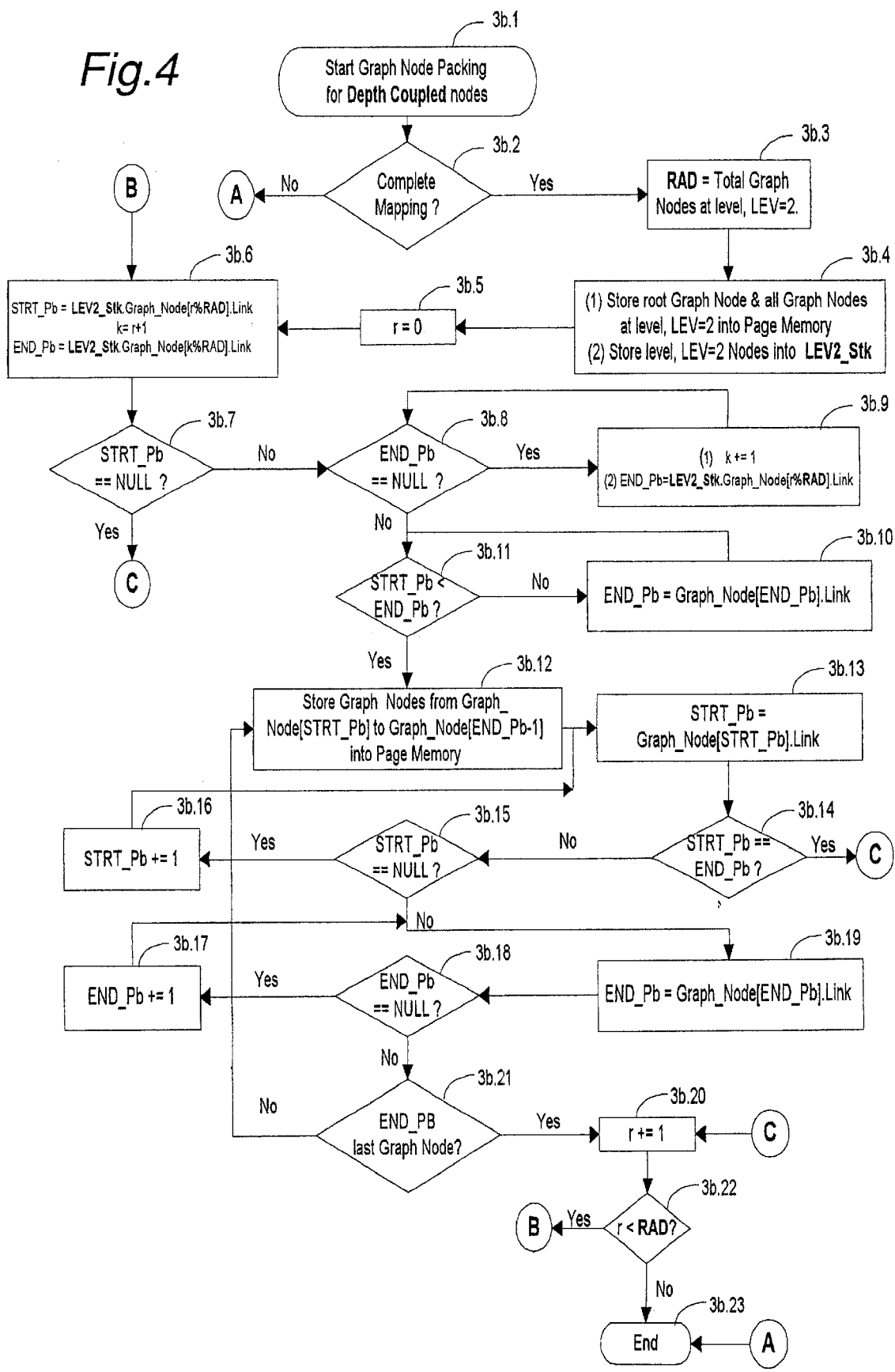

METHOD AND SYSTEM FOR STORAGE AND RETRIEVAL OF MULTIMEDIA OBJECTS

BACKGROUND OF THE INVENTION

1. Field of the Invention

This invention relates to the storage, retrieval and organization of multimedia objects in a distributed and federate fashion. These multimedia objects may contain synchronized audio and video information, audio and video in unsynchronized form, general data and executable codes. The storage method used enables scalability and allows efficient managing, naming and administering of multimedia objects in a heterogeneous manner. The present invention relates to a storage method for enhancing retrieval of multimedia objects by minimizing the amount of memory, which the search algorithm must, traversed during data retrieval and storage.

2. Description of the Prior Art

Data processing systems often utilize "trees" structure for data storage. A "tree" structure is a structure containing a "root" node and a plurality number of "tree" and "leaf" nodes in which there is only one path between any nodes in the tree. In a tree structure, the "root" node is in the highest level, the "tree" nodes are in an intermediate level and the leaf nodes are in a lowest level. The tree structure may be an efficient way that provides a hierarchy for large segments of data and retrieving specific segment of data. Segments of data are stored in the nodes of the tree structure.

In the case of a 3 level tree structure, the tree structure consists of a "root" node as a first level, a second level of tree nodes and a third level of "leaf" nodes. To store data in this tree structure, main data segment can be stored in the "root" node and some other sub-data stored in the "tree" nodes. Another sets of nodes under each "tree" nodes are further categorized into "leaf" nodes of the respective "tree" nodes. In order for storage and retrieval of data segment in a tree structure, the tree structure is traversed. To allow traversal nodes in the tree structure where the data segments reside, each node in the tree structure must carry sufficient pointer information for the memory location of lower layer "tree" nodes or "leafs" nodes. The pointer information is referred to as the link of the nodes. For the "root" node and each "tree" node in a tree structure, there must be N number of memory pointers to register the location of each node at a lower layer which contains N number "tree" or "leaf" nodes. As a consequence, there is a tendency for the "root" node and "tree" nodes in a tree structure of arbitrary size in terms of nodes to have a limited number of "tree" or "leaf" nodes for the adjacent level of nodes.

While other some tree structure requires a "balanced" structure, that is, a tree structure in which all but the bottom nodes are completely filled. It could be possible to map an "unbalanced" tree structure to a balanced tree structure by introducing null nodes into the "balanced" tree structure By doing this, redundancy is introduced. Introducing null nodes has a harmful effect on the memory size requirement of virtual memory data processing systems, wherein fixed-length blocks of memory often referred to as "page" are utilized. Each node of a tree memory in a virtual memory may result in none continuous storage of nodes because of redundant nodes being introduced. In the virtual memory, this may result in a page fault, if "paging" is utilized, which greatly increase the amount of time required to retrieve data within a tree structure.

To represent a tree structure in a graph node, as discussed in "Data Structure and Algorithm Analysis in C", Benjamin/Cummings publishing Co., Inc, 1993, requires 2 memory pointers to store the location of 'sibling" and "child" node. Sibling node is a node in the same level while "child" node is a node in a lower level of the tree structure. Using 2 pointers allows allocation of memory of the "leaf" nodes to be located in non-adjacent memory location. Again this has a deleterious effect on the paging scheme used in the virtual memory as described in the preceding paragraph.

SUMMARY OF THE INVENTION

The present invention provides a method of providing an efficient data storage and data retrieval while retaining the hierarchy of a tree, eliminating the problem of conventional branches to facilitate searching and to improve multimedia objects retrieval by preventing the problem of page faults which may encountered during traversing from occurring.

The present invention provides an improved method of solving the problem encountered in managing and allocating pointer memory of "root" node and each "tree" node for adjacent level of "leaf" nodes and "tree" nodes in a multi-level tree structure. In conventional methods, more than 2 memory pointers are required for each "tree" node to retain the hierarchical structure of a tree. The present invention uses a single pointer memory location to store the location of next node while still retaining a substantial amount of information of the tree structure.

The present invention also provides a method for preventing multimedia objects from random fragmentation found during storing and retrieving data fragmented in segments of smaller pieces of data of unequal size in the case where each data segment has a strong coupling which can be best represented in a hierarchical form.

The present invention provides means to reduce the complexity of a tree structure by decomposing a highly complex and unmanageable tree structure into a highly manageable format that aids in retrieval of multimedia objects that are strongly coupled or data that are related with minimal memory paging fault.

This invention provides an improved method and system for enhancing data retrieval and storage in a multilevel tree structure by significantly reducing the required amount of time and memory that must be traversed during data retrieval and data storage for both depth-first and breath-first search.

To resolve the problems outlined in the above section, the invented method and system provides means of decomposing a tree structure of any arbitrary form into a graph map with either breath or depth coupling by mapping nodes of the tree structure into nodes with a single vertex; means of organizing the nodes in the graph map into page memory to improve paging during data retrieval; means to traverse efficiently with minimal paging fault for data or multimedia objects with strong coupling; means of traversing in depth-first search in a depth coupled graph map without page fault using an efficient traversing algorithm; and means of traversing in a breadth-first search in a breadth coupled graph map without page fault using an efficient traversing algorithm.

Storage of multimedia objects organized in a hierarchical ordered tree nodes is efficiently performed by decomposing the tree nodes organized in a conventional tree structure into graph nodes with a single-link to register location of graph nodes which is a representative of child tree nodes. The multimedia objects organized in a series of single-link graph nodes can then be stored in a distributed and federated manner providing a system for managing and administering the multimedia objects. The graph nodes are compacted into page memory based on either a depth coupled or breadth coupled multimedia objects to minimized paging fault during multimedia objects retrieval. To enable fast retrieval of the multimedia objects organized in a sequence of graph nodes, a depth-first and breadth-first algorithm is designed to enable fast retrieval and browsing of the specific multimedia objects stored in page memory as graph nodes.

As used herein, the use of the terms "federated" or "federated manner" refer to a manner whereby multimedia objects organized as different branches of a tree structure are managed by different entities. In other words, "federated" refers to a structure where different entities manage different branches or parts of a tree structure. As used herein, the use of the phrases "distributed" or "distributed manner" refer to a manner whereby the different parts or branches of a tree structure (i.e. multimedia objects organized into a tree with logical inter-connections) are managed by a single entity. As used herein, "depth coupled" refers to vertical linkage of multimedia content whose objects are arranged in a tree structure, such as a root-tree link or a tree-leaf link for example. As used herein, "breadth coupled" refers to horizontal linkage of multimedia content whose objects are arranged in a tree structure, as is used to indicate two objects at the same level within a branch for example.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 4 is a flow chart of graph node packing for depth coupled nodes;

DETAILED DESCRIPTION OF THE PREFERRED EMBODIMENTS

The invention will best be understood by reference to the following detailed description of an illustrative embodiment when read in conjunction with the accompanying drawings.

Figure 1:
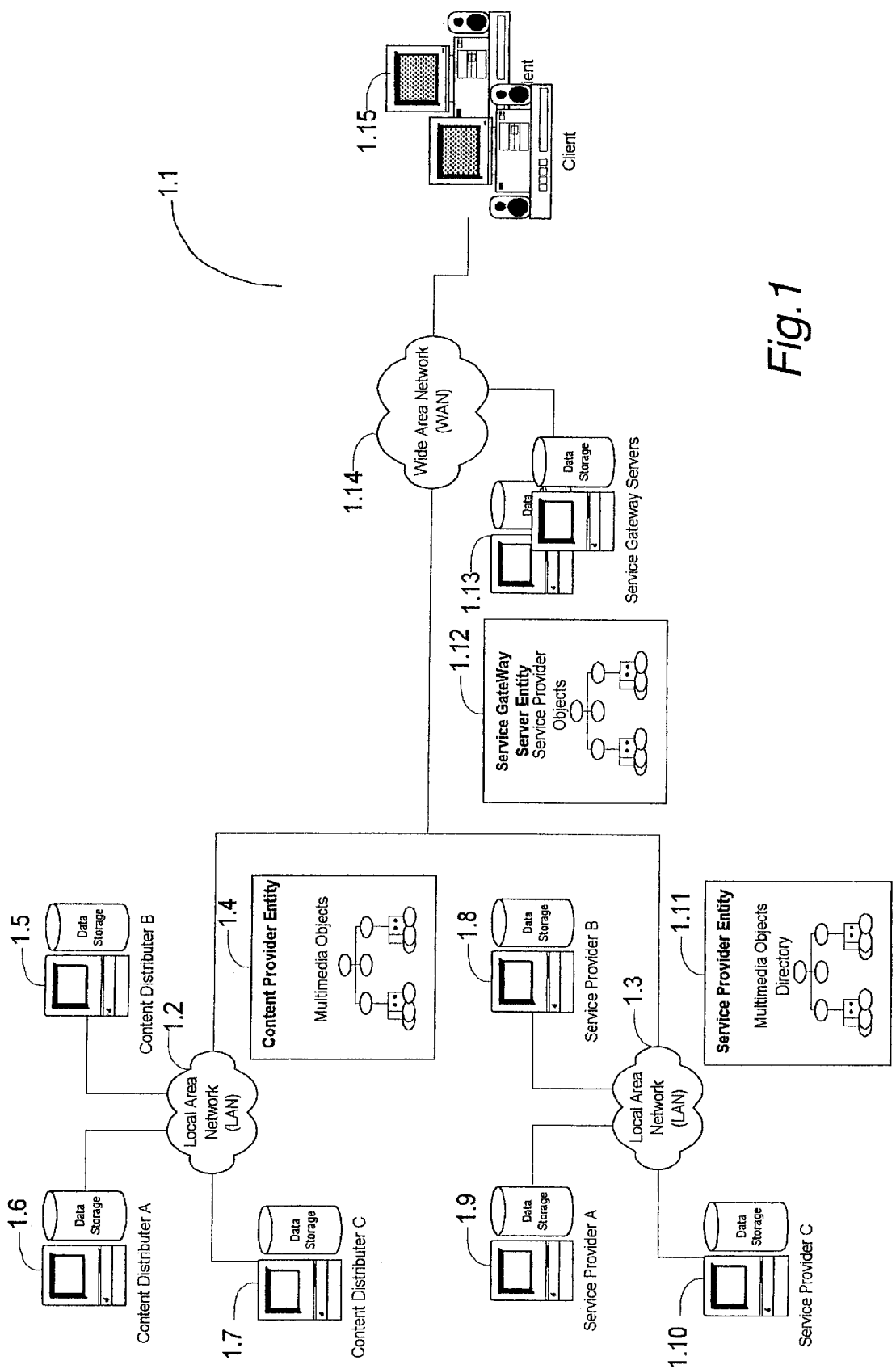
FIG. 1 is a system for Multimedia Objects Distribution to which the method and system of the present invention is applied.

With reference to the FIG. 1, it depicts the pictorial representation of a distributed multimedia object storage and retrieval system which, may be utilized to implement the invention. Multimedia object defined here refers to one or more sets of data and executable codes used for multimedia presentation and manipulation. As it may be seen, the distributed multimedia objects system 1.1 may include a plurality of networks such as Local Area Network (LAN) 1.2, 1.3 and Wide Area Network (WAN) 1.14. Sub-System blocks indicated by reference numerals 1.2 and 1.3, 1.14, may include a plurality of individual computers 1.5,1.6,1.7, 1.8,1.9 and 1.10 with local data storage. Both Local Area Networks 1.2 and 1.3 are interconnected via the Wide Area Network 1.14, allowing computers in LAN 1.2 to be interconnected with computers in LAN 1.3. Not shown in FIG. 1 may consist of a plurality of networks for additional clusters of computers functioning as Content Provider Entity, indicated by reference numeral 1.4, and Service Provider Entity, indicated by 1.11. Each individual network cluster allows a mixture of Content Providers Entities and Service Provider Entities to co-exist and inter-operate. Computers indicated by 1.5, 1.6 and 1.7 are logically individual content providers implementing the function of the Content Provider. Computers indicated by 1.8, 1.9 and 1.10 are logically individual Service providers implementing the function of Service Provider Entity. Each individual content provider being managed, named and distributed multimedia objects originates from the computer. It also allows the multimedia objects originated from the individual computer to be stored at it's own local storage or at a selected computer that implements the Service Provider Entity.

Content Provider Entity 1.4 is a functional entity that manages the creation, manipulation, administration and organization of multimedia objects originating from the computer designated to carry out the w Content Provider Entity function. The Content Provider can also choose to have multimedia objects originating from it to be stored in the computer functioning as the Service Provider. Multimedia objects created are stored in a hierarchical form based on a tree structure. Only multimedia objects stored in local storage is managed by the Content Provider.

Service Provider Entity 1.11 is a functional entity that manages a list of services or multimedia objects originating from the service provider and also contents provided by content providers registered with the Service Provider. The Service provider Entity publishes the contents provided by the content provider. The Service Provider Entity also organizes and stores multimedia objects in a hierarchical form based on a tree structure. The Service Provider not only manages the multimedia objects originating from itself but also from the Content Provider. It provides directory services to the registered Content Providers and the multimedia objects originating from the Service Provider.

Service Gateway Server Entity 1.12 is a functional entity that interacts with clients 1.15 and provides the clients with information on the location of multimedia objects. It also allows the client to browse through the various tree structures. The tree structure at w the Service GateWay Server locates the multimedia objects requested by clients by providing the data description of the service provider objects. Using these data description provided, the Service GateWay Server provides a link to an exact location of the multimedia objects that the client wishes to access. Browsing operation is equivalent to traversing through the tree structure which the latter part of the embodiment will describe algorithms for traversing.

As discussed above with respect to the Content Provider Entity, Service Provider Entity and the Service Gateway Entity, each entity may contain and manage a plurality of tree memory structures. In the depicted embodiment of the present invention, the hierarchical ordered multimedia objects having strong linkages or couplings are stored and maintained in a tree structure of arbitrary size. The present invention enables these three entities to collaborate and publish multimedia objects organized in the tree structure and to allow multimedia objects to be published in a distributed and federated fashion.

With reference to FIG. 5, there is a depicted pictorial representation of 7 levels tree structure. It includes a root node, as indicated by reference numeral 6.1, located at level 1. Level 2 contains the 3 child nodes of the root node, indicated by 6.2, 6.3 and 6.4. Node indicated by 6.3 and 6.4 are termed the sibling nodes of node indicated by 6.2.

Figure 2A:
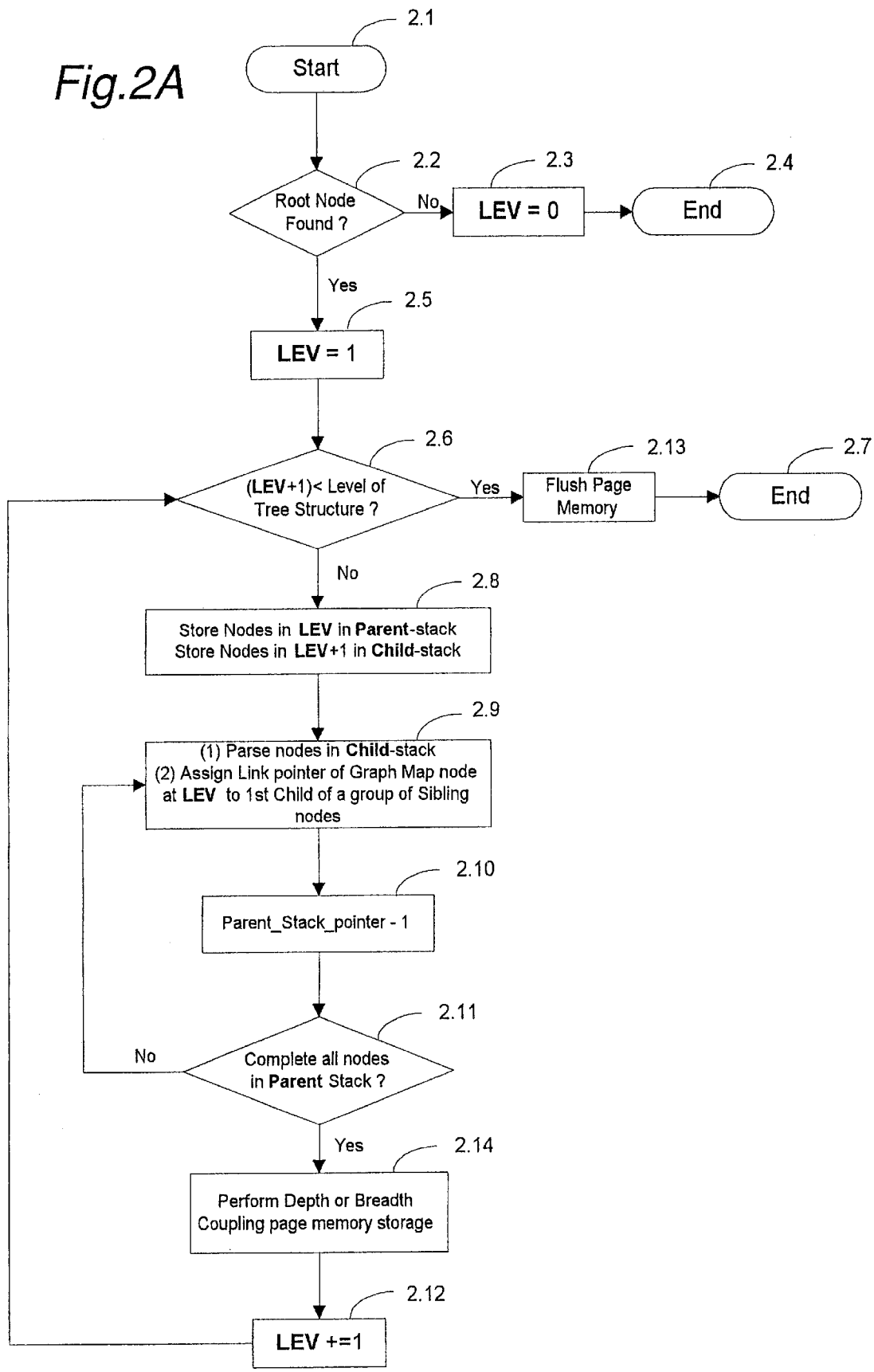
FIG. 2A is a flow chart of tree nodes to graph nodes mapping and FIG. 2B shows a relationship between parent nodes and child nodes.

Referring to FIG. 2A, there is a depiction of a tree structure being mapped to a graph map composed of single-link node. The flowchart is a high-level logic depiction of software implementation of the method and system of the present invention. FIG. 2A also shows an iterative method used in assigning the link pointer memory of the single-link node to register the location of adjacent 1st child node within a set of "sibling" nodes. The number of levels in the tree structure is used as an input parameter by the flow chart to determine the number of iteration needed to assign the links of the parents nodes with the location of the first child node. As the algorithm is initiated, an identification of the root of the tree structure or the base of the sub-tree to be optimized, as shown at step 2.2, is performed. The root node is determined by the fact that it is the 1st node to be processed by the process of tree node to graph node mapping. If no root node is identified,.the returned value of LEV is Null, as shown at 2.3. It is used to indicate that the tree has no root node. The algorithm terminates if no root is found. LEV is used to store the current level of the tree structure the algorithm assigns the link value of the graph nodes. If the root of the tree structure is found, the variable LEV is initialized to 1, at step 2.3. The value in LEV is incremented as algorithm moves down the hierarchy of the tree structure, as indicated at 2.12. The tree nodes at level as indicated by current value of LEV are stored in Parent-stack memory and nodes at (LEV+1) are stored in Child-stack memory. Storing of adjacent level of nodes are performed by the process indicated at step 2.8. The nodes at each level are stored by pushing the nodes at the level indicated by value LEV & LEV+1 starting from the right to left of the tree structure into the Parent-stack and Child-stack memory respectively, as shown in step 2.8. The rightmost tree node of each level of the tree structure will be assigned with the memory location of the Child node first. The value of the link pointer of the graph nodes in the Parent-stack memory is assigned to point to the memory location or the first child nodes of a group of sibling nodes, as shown in step 2.9. Reference numeral 2.15 shows the basic structure of the Parent stack and 2.16 shows the structure of child stack. For each level of the tree structure, the graph nodes are stored in the Parent-stack, the adjacent level of tree structure is stored in the child-stack. Assignment of the link pointer of the graph node in the parent-stack is stated in the conditions shown in step 2.9. Reference numeral 2.17 is a graphical representation of the link pointer of the graph node in the parent-stack to indicate the first child node of "sibling" nodes which is represented by the graph node in child-stack. Depending on the tree structure, some of the graph nodes in the Parent-stack memory are not assigned with any value. A NULL value is assigned to the link if the graph node in the Parent-stack memory has no Child node. Each node in the Parent-stack memory passed through the process indicated by steps 2.9 and 2.10 until all link pointers of the graph nodes are assigned. The algorithm terminates when all link pointers of the graph nodes at (total number of levels in tree structure-1) level are assigned, as indicated at step 2.6. For each level of tree nodes mapped to the graph nodes, the graph nodes are stored and compacted into page memory based on the type of graph nodes coupling selected as shown by step 2.14. Step 2.13 indicates the process that stores the last page memory used for storing all the graph nodes used to represent the tree structure regardless if the page memory is full. Steps 2.4 and 2.7 indicate two possible exits of this algorithm.

Figure 2B:
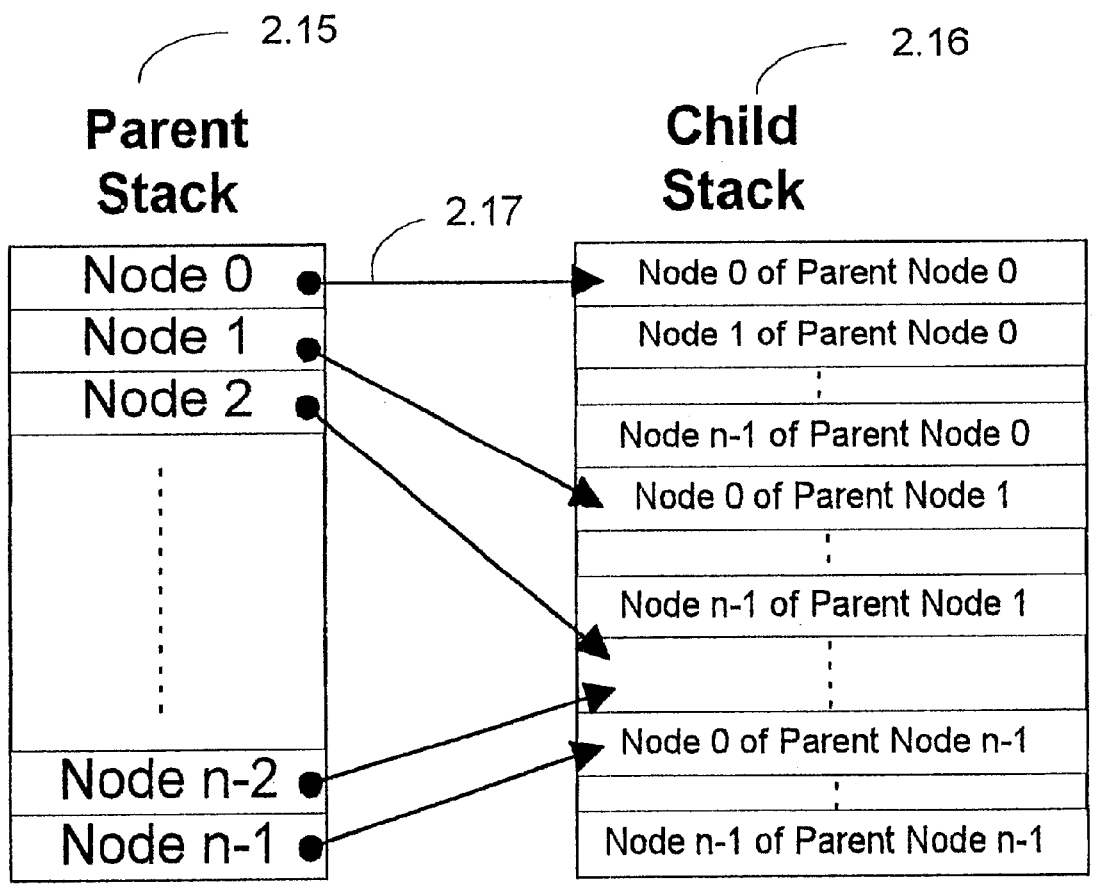
Figure 3:
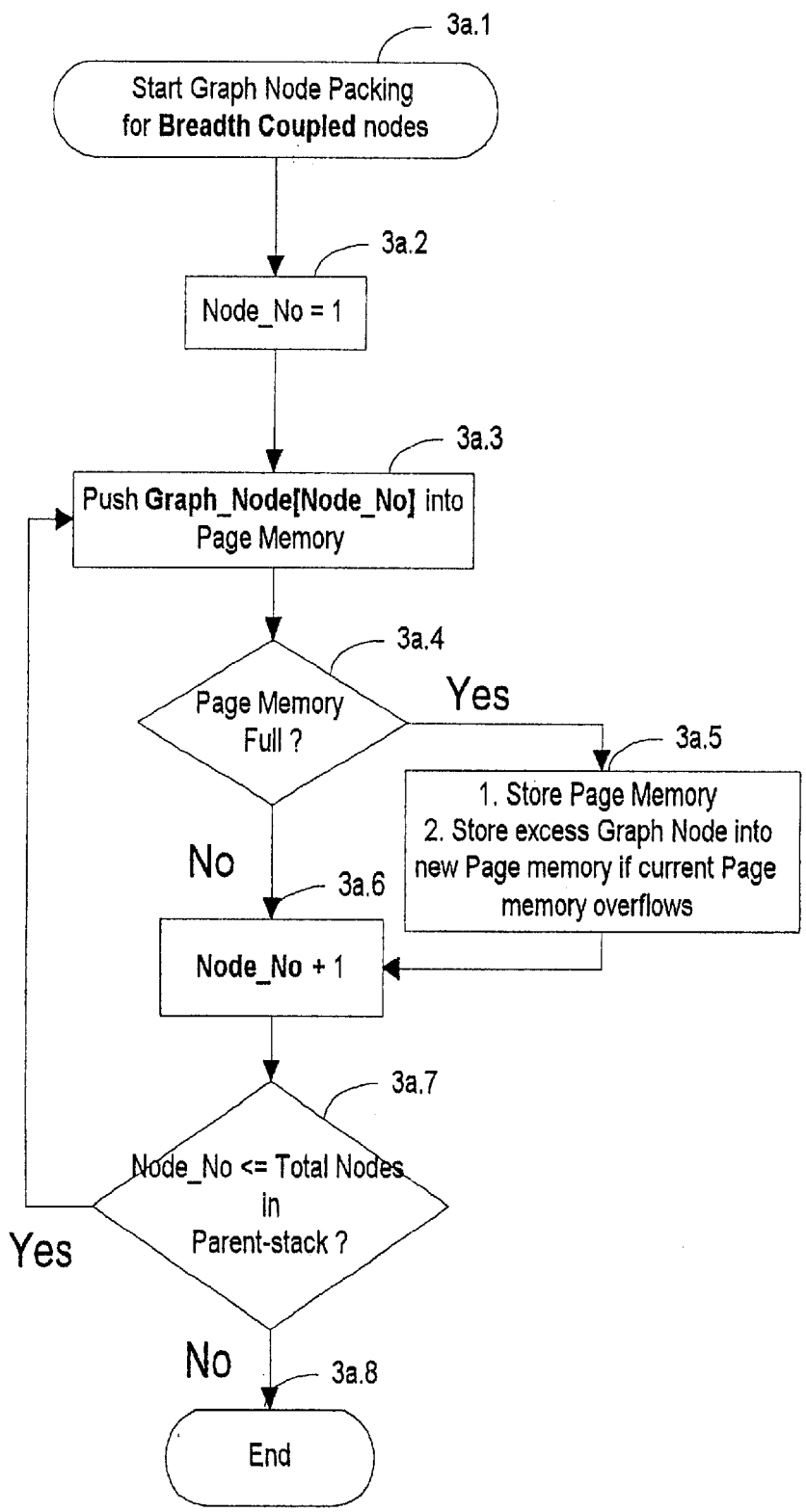
FIG. 3 is a flow chart of graph node packing for breadth coupled nodes.

Following the algorithm for mapping a typical multilevel tree structure to a graph map, as indicated in step 2.14 of FIG. 2, storing of Graph Nodes into a page memory is based on the packing method illustrated in FIGS. 3 and 4. FIGS. 3 and 4 show processes of compacting memory space for storing graph nodes representing the tree structure based on 2 separate criterion; depth coupling and breadth coupling. The mapping of tree nodes to graph nodes resulted in the addressing or naming of graph nodes in sequential order starting from the highest level of the tree structure with the tree nodes on left side of the level receiving the higher priority. Naming and addressing of the graph node can be of any representative with incremental properties as it traverses through the tree structure. In the case of breadth coupled nodes, packing of graph nodes begins from the process indicated by step 3a.1. Packing for breadth coupled nodes can begin immediately after each level of nodes of the tree structure are mapped to graph nodes as carried out by the process indicated by steps 2.8,2.9,2.10 and 2.11. Packing is performed for the graph nodes in parent-stack and the packing process for the level of tree nodes ceased when all graph nodes in the parent stack were completed as indicated by step 3a.7. Graph node is fetched from the parent stack and stored into a page memory as shown in step 3a.3. The page memory is stored when the page memory is full, as indicated by step 3a.5. If the current page memory cannot fit in the current graph node based on the size of the graph node, the current page memory will be stored in a new memory page. The process indicated by step 3a.4 determines if the current graph node can be fitted into the remaining empty portion of the page memory. The remaining unused portion of page memory will be left empty.

Now, referring to FIG. 4, step 3b.1 indicates the beginning of the compacting algorithm for depth coupled nodes. Compacting of memory starts when mapping of all nodes in the tree structure to graph nodes were completed, as indicated by step 3b.2. Process indicated by step 3b.3 calculates the number of graph nodes at level LEV=2 of tree structure. The value is stored in the variable RAD. For low paging fault and high speed graph node retrieval, the first few memory pages contain the graph nodes that represent the 2 highest level of "tree" nodes of the tree structure. Storage of the graph nodes at LEV=1 and LEV=2 into page memory is performed by process indicated by step 3b.4. (Storage of graph nodes into page memory can follow the process similar to steps 3a.3, 3a.4, 3a.5 and 3a.6 and the pictorial description illustrated in FIG. 6.) Process indicated by step 3b.4 also stores all graph nodes at LEV=2 into the stack LEV2_Stk. The variable r registers the location of each graph node stacked in stack memory LEV2_Stk. Step 3b.6 indicates the process of computing the location of 1st "child" node of 2 adjacent tree nodes. STRT_Pb stores the location of the 1st "child" node of "tree" node k. END_Pb stores the location of the 1st child node of graph node k+1. Both k and k+1 are graph nodes that represent the tree nodes at the same level of the tree structure (see FIG. 7 for reference). A NULL value in either variable END_Pb or STRT_Pb indicates that there is no sub-node below the current "tree" node. Decision process shown by step 3b.7 determines if the link address of current node stored in STRT_Pb is NULL. Process shown by steps 3b.8 and 3b.9 search for END_Pb with a link address of sub-node. The address or name stores in the link pointer of graph node indicates the location of the child graph node. The address or name provides the logical connection between the "tree" node and the "child" node. Sibling nodes are nodes with an address or name that has an incremented representative of the address or name of the adjacent node in the same level. Once the non-NULL value END_Pb and STRT_Pb have been found, the graph nodes are stored in a page memory, as indicated by step 3b.12. Storage is performed on the condition that the STRT Pb has a naming or address convention that has a smaller representative than END_Pb as indicated by step 3b.11. Process indicated by step 3b.10 enables the END_Pb to search for graph nodes link that has a larger representative value than STRT_Pb. Storage of graph nodes into the page memory should follows the method as indicated by steps 3a.3, 3a.4, 3a.5 and 3a.6. New values for STRT_Pb and END_Pb both of which must be non-NULL values should be obtained as the algorithm of traversal down of the tree structure. This downward traversal search for non-NULL STRT_Pb value is performed by processes indicated by steps 3b.13, 3b.16, 3b.15 and 3b.14. Processes indicated by steps 2b.17, 3b.18 and 3b.19 perform the downward tree traversal search for non-NULL END_Pb value.

Figure 5A:
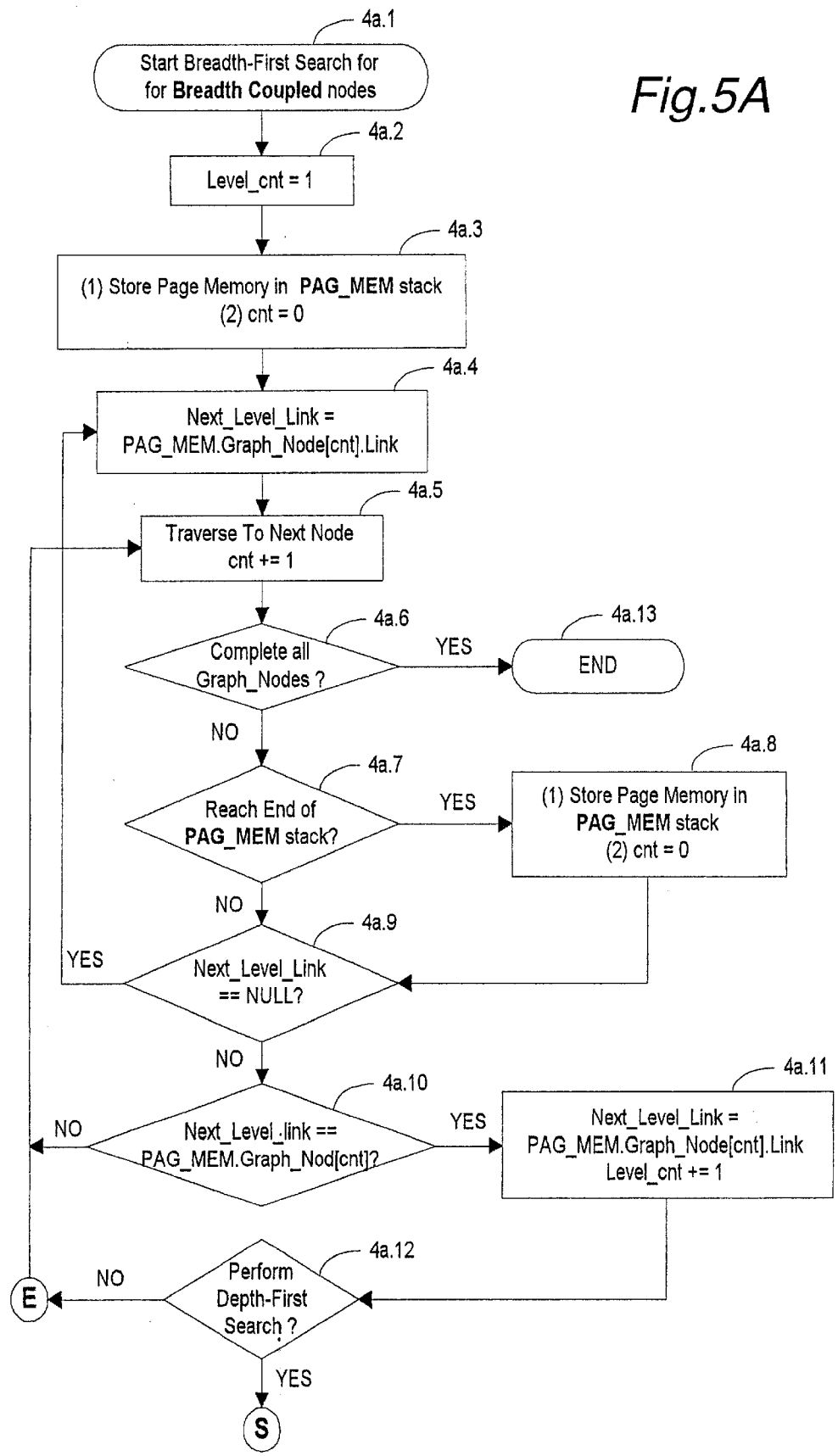
FIGS. 5A and 5B are a flow chart of breadth-first and depth-first search graph nodes traversal.
Figure 5B:
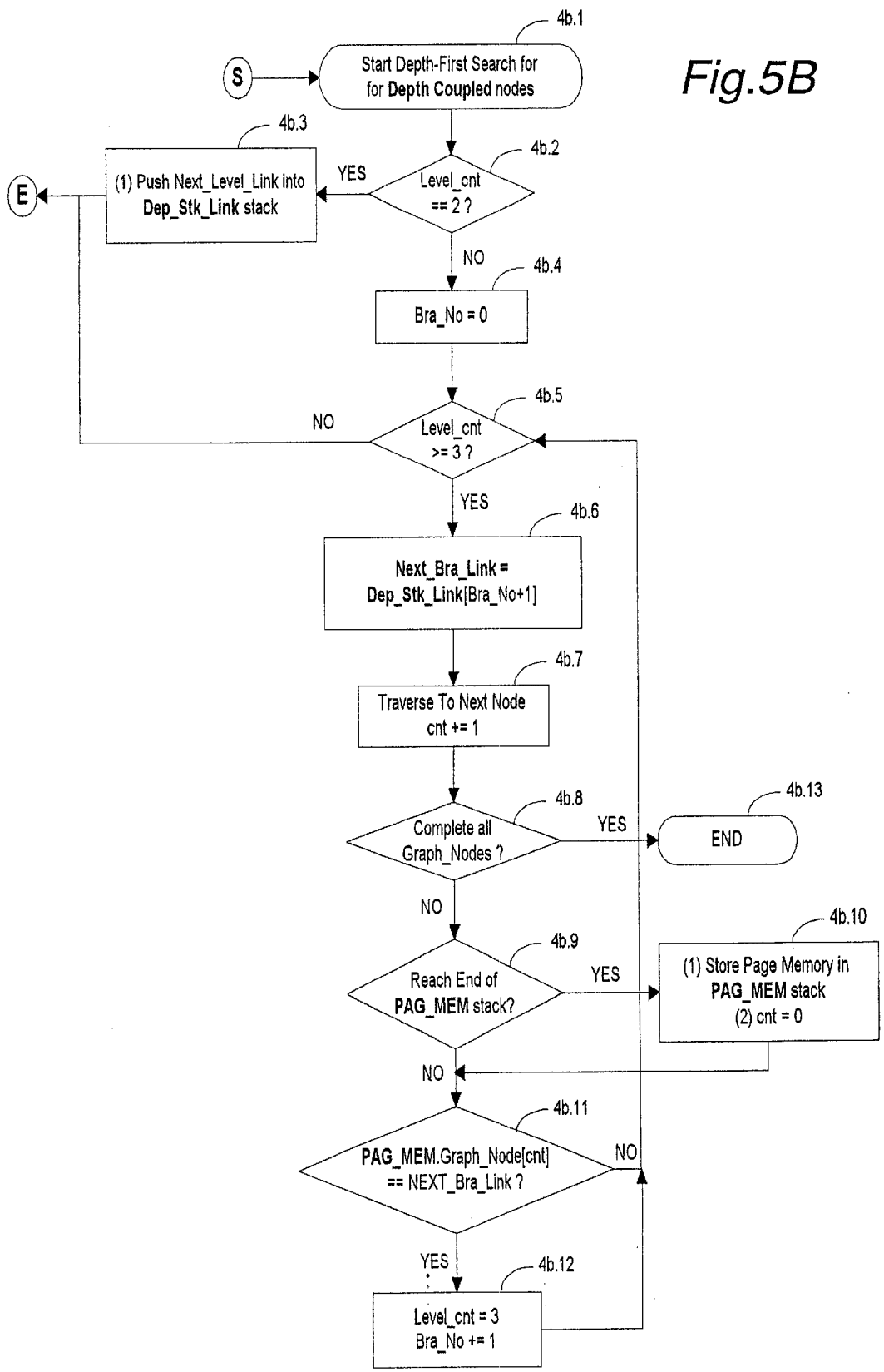

FIGS. 5A and 5B show a generic traversal algorithm based on depth-first and breadth-first search. This algorithm is also used in navigating when browsing through the tree structure that is either breadth or depth coupled. Step 4a.1 starts traversing the tree structure in breadth-first search for a breadth coupled tree. Graph nodes of the tree structure are first retrieved from the page memory and stored in PAG_MEM stack. PAG_MEM stack can be implemented using a high-speed memory to facilitate retrieval of graph nodes in the page memory, as shown by step 4a.3. The variable cnt in the process indicated by step 4a.3, is used to keep a counter on the number of graph nodes in the page memory stored in PAG_MEM stack. Process shown in step 4a.4 locates the graph node in the next level of the tree structure by reading the link pointer value, as indicated in PAG_MEM.Graph_Node[cnt]. Link, in the pointer memory location (see FIG. 6). PAG_MEM.Graph_Node[cnt] refers to the graph node stored in the PAG_MEM stack and indexed by cnt which stored the current number of graph w node that have been traversed. Link is the link pointer value stored in the pointer memory location of the graph node. The first graph node in the first page represents the root node. Link of first graph node stores the location of level 2 first node of the tree structure. The algorithm traverses to the next node in the page memory if one can be found as indicated by step 4a.5. Control processes indicated by steps 4a.6, 4a.7 and 4a.8 perform the search for next graph node in the page memory. Process performed by step 4a.5 allows the algorithm to either retrieve or skip the data content of the graph node. Processes performed by steps 4a.10 and 4a.11 allows the algorithm to search for the particular level within the tree structure. Decision process performed by step 4a.12 enables the algorithm for breadth-first search of a breadth-coupled tree to start depth-first search after the algorithm completing traversing 2 levels of nodes of the tree structure. Connector S indicates the beginning depth-first search and connector E indicates the exit from depth-first search if all nodes of level 2 of tree structure have been completed.

Now, taking reference from FIG. 5B, step 4b.1 shows the beginning of the depth-first search traversal process of the depth-coupled tree structure. Decision processes 4b.2 and 4b.3 provide the traversing process with the information on the number of sub-tree branches existing in the tree structure. The link pointer value is pushed into Dep_Stk_Link_ stack for non-NULL link address of every graph node at level 2 of the tree structure. Dep_Stk_Link stack is a memory stack that stores all the link pointer values of all graph nodes that are the representatives of all "tree" structures nodes at level 2. Depth-first search of the tree structure begins after the representatives of nodes level 3 of the tree structure was detected, as indicated by step 4b.5. Process performed by step 4b.6 keeps the graph node which is the representative of the adjacent node at level 2 of the tree structure. The end of the depth search for the sub-tree branch that starts from level 2 of the tree structure is completed when the algorithm found the graph node which is the representative of the adjacent tree node at level 2. End of the sub-tree branch is determined by decision process indicated by step 4b.1. Process performed by step 4b.7 allows the traversing process of the algorithm to either retrieve or skip the access of the multimedia objects stored in the graph node. Similar to the step indicated by 4a.5, traversing is the process of accessing the graph nodes in the PAG_MEM in sequential order. This is achieved by the fact that the size of the graph node is known which makes traversing from the current graph node to the adjacent graph node simplify by reading the size of the current graph node stored in the pointer memory. Processes performed by steps 4b.8, 4b.9 and 4b.10 control the retrieval of graph nodes from page memory and minimize paging fault. Page fault is minimal for depth-first process because the page memory for depth coupled has a graph node of the representative "sibling" tree node stored as adjacent graph nodes within the same page memory or on an adjacent page memory. Process performed by step 4b.12 enables to give the additional information such as the level of the tree structure and the number of sub-tree branches having been traversed as the algorithm traverse through the representative tree structure.

Figure 6:
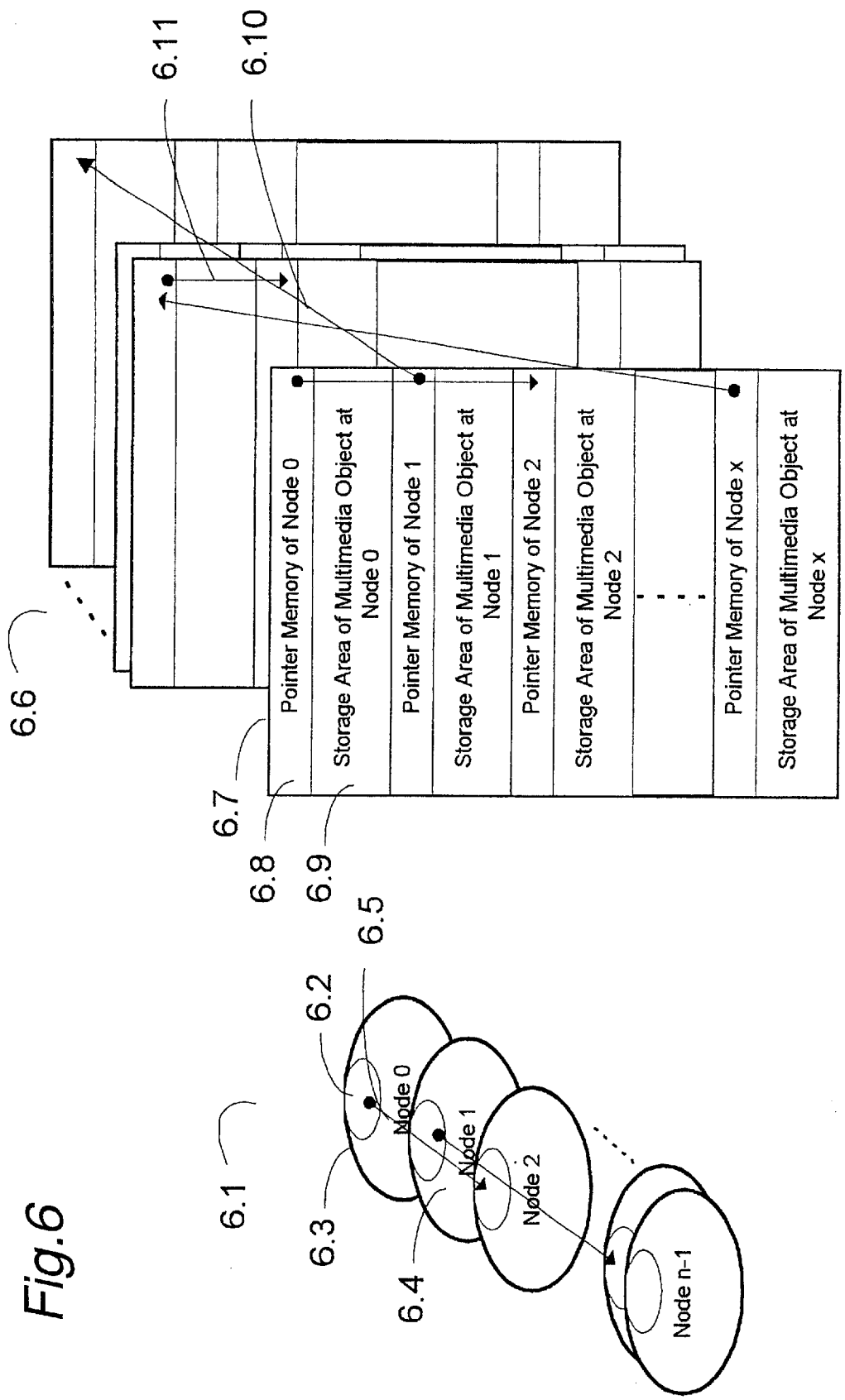
FIG. 6 shows a single link graph node and page memory structure according to the present invention.
Figure 7:
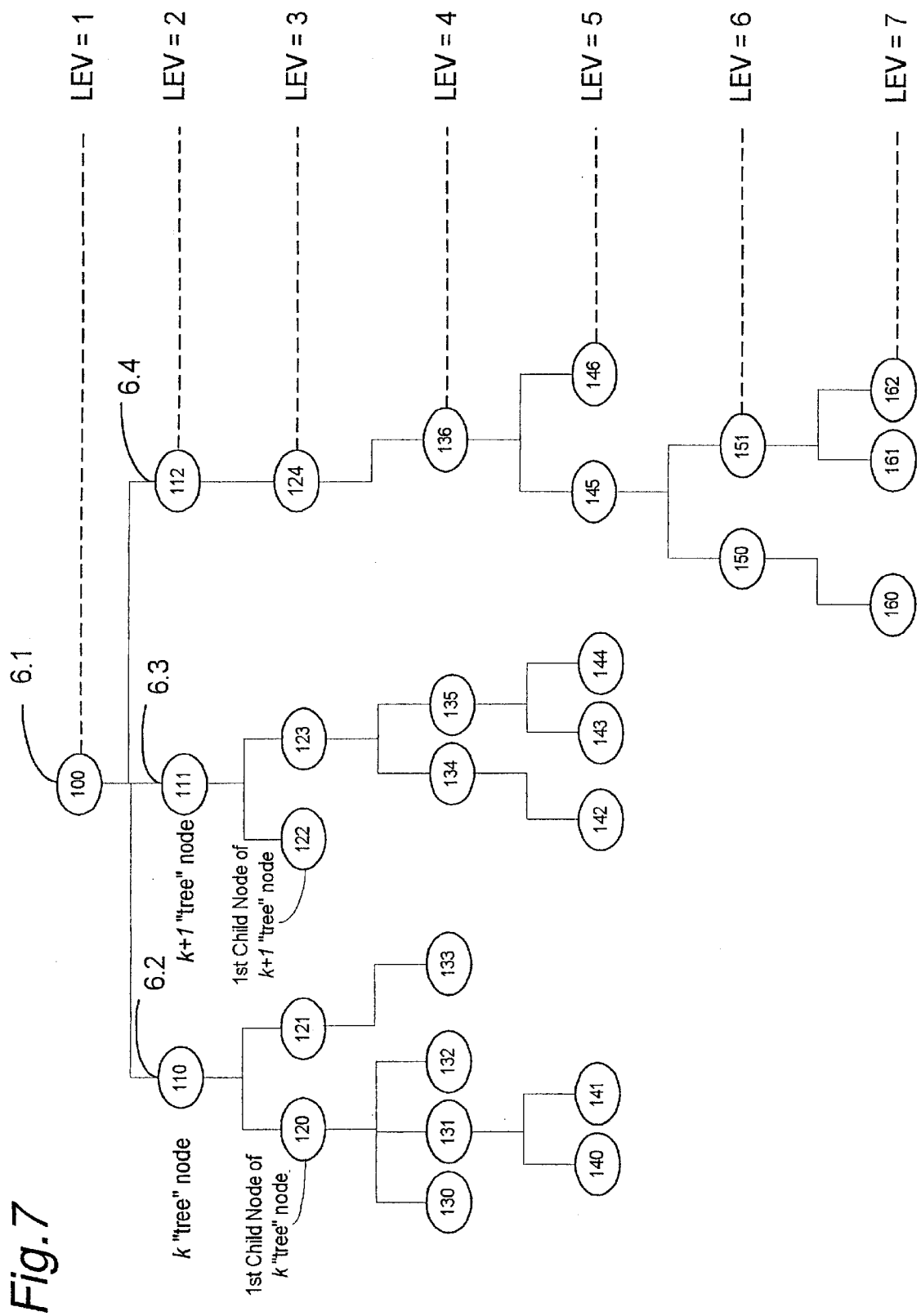
FIG. 7 shows a conventional multilevel tree structure of data.

Reference numeral 6.1 of FIG. 6 shows a structure of the single link graph node and relationship between graph nodes for the set of n number of graph nodes. Reference numeral 6.2 is a graphical representation of the pointer memory of the graph nodes. The pointer memory of the single link graph node provides the necessary amount of storage for the graph node x which is the representative tree node of tree structure level n, to locate the location of graph node x+1. Graph node x+1 is a representative of the 1st child node of a set of "sibling" tree nodes at tree structure level n+1. Pointer memory is a memory space used to store necessary information including the graph node size and link pointer which locate the next level of "tree" nodes. Additional information in the link pointer may include the network address where the graph node resides. The link pointer can be used to locate the next Graph Node for both inter-page and intra-page memory. Reference numeral 6.3 is a graphical representation of the single link graph node which consists of the pointer memory space as indicated by 6.2 and a multimedia object storage space as indicated by reference numeral 6.4. Reference numeral 6.5 is a graphical representation of the next graph node pointer stored in the pointer memory used to locate the next graphical node.

Still with reference to FIG. 6, reference numeral 6.6 gives a graphical representation of the a number of page memory necessary to stored all n number of graph nodes. Reference numeral 6.7 gives the structure of the page memory which consists of a memory space for pointer memory of the graph node, as indicated by 6.8 and a memory space for the storage of the multimedia object, as indicated by 6.9. Both reference numerals 6.10 and 6.11 are the pointer values for next graph node's locations of an inter-page memory and an intra-page memory, respectively.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for storing and organizing multimedia objects by decomposing a multi-level tree structure having a plurality of nodes into a graph map using single-link graph nodes corresponding to the plurality of nodes of the multi-level tree structure and implemented using a single set of memory locations, comprising:

(a) assigning one of a name and an address to each node in the tree structure in ascending order from a root node until the last leaf nodes in the last level of the multiple level tree structure have been reached and storing the assigned one of the name and the address of the next multimedia object in the single-link graph node memory location;

(b) mapping each node in the tree structure to a single-link graph node, said single-link graph node consisting of a pointer memory location that stores the one of the name and the address of a first child node of sub-tree nodes in a lower level of the tree structure; and (c) storing the graph nodes that are multimedia objects arranged one of horizontally and vertically in a tree structure into a page memory.

2. The method according to claim 1, further comprising composing an arbitrary size tree structure into serially structured graph nodes with a single memory location that indicates a next multimedia object.

3. A method of packing sequentially ordered graph nodes into a page memory for graph nodes that are one of vertically and horizontally arranged in a tree structure based on the serially structured graph nodes according to claim 2.

4. A method according to claim 1, further comprising packing tree nodes into a memory page to minimize page faults during multimedia object retrieval by packing an integer number of serially structured graph nodes into the memory page bounded by the fixed memory space of the page memory.

5. A method that enables organizing and administering a plurality of groups of multimedia objects organized in a tree structure in a distributed manner such that one entity manages the interconnection of one or more multimedia objects that do not belong to a same branch of a tree; and a federated manner such that one entity manages a group of branches or a specific branch of multimedia objects belonging to a tree, by storing network address and the memory location of the adjacent graph node in a pointer memory of a graph node.

* * * * *